W. J. MERCER.
Seed-Planter.
No. 213,227.  Patented Mar. 11, 1879.
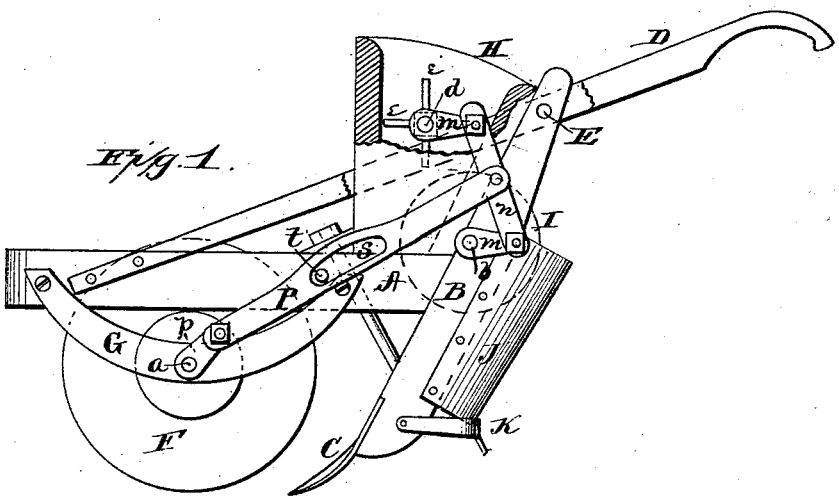
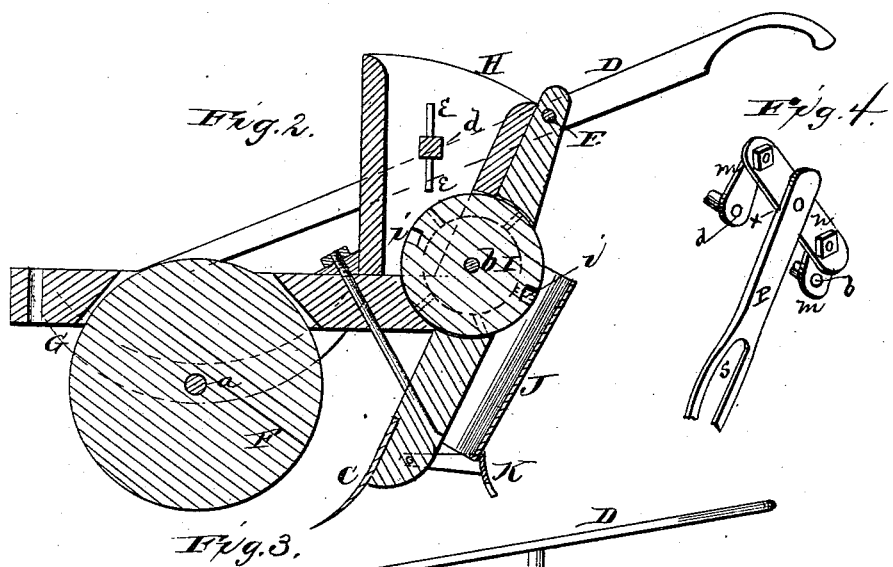
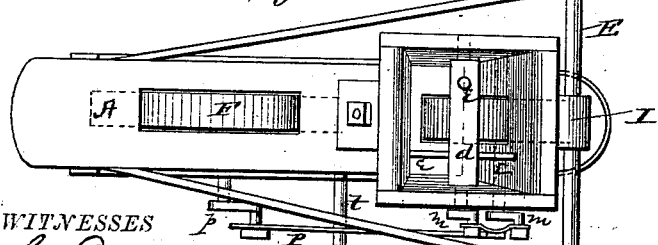
WITNESSES  
INVENTOR  
W. J. Mercer  
By Alexander Tushun  
ATTORNEYS

UNITED STATES PATENT OFFICE.

WILLIAM J. MERCER, OF HOMER, ASSIGNOR OF ONE-HALF HIS RIGHT TO JOHN S. YOUNG, OF CLAIBORNE PARISH, LOUISIANA.

IMPROVEMENT IN SEED-PLANTERS.

Specification forming part of Letters Patent No. 213,227, dated March 11, 1879; application filed January 14, 1879.

*To all whom it may concern:*

Be it known that I, WILLIAM J. MERCER, of Homer, in the parish of Claiborne, and in the State of Louisiana, have invented certain new and useful Improvements in Seed-Planters; and do hereby declare that the following is a full, clear, and exact description thereof, reference being had to the accompanying drawings, and to the letters of reference marked thereon, making a part of this specification.

The nature of my invention consists in the construction and arrangement of a seed-planter which is simple in construction, and can be readily adjusted for planting cotton, corn, pease, or other grain, and can be used in either rough or smooth land, or anywhere that a single horse and plow can be used.

In order to enable others skilled in the art to which my invention appertains to make and use the same, I will now proceed to describe its construction and operation, referring to the annexed drawings, in which—

Figure 1 is a side view, Fig. 2 is a longitudinal section, and Fig. 3 a plan view, of my machine. Fig. 4 is a detailed view of part thereof.

A represents a plow-beam, with foot or standard B secured to its rear end. C is the plow, attached to the lower end of the foot B. D D are the handles, having their front ends secured to the sides of the beam, and near their rear ends secured to a round, E, passing through upper end of the foot or standard B.

To the sides of the beam A are attached two bent or curved metal bars, G G, between which is placed the driving-wheel F, the journal or axle $a$ of said wheel having its bearings in the bars G. The upper portion of the wheel F projects into and through a mortise in the plow-beam A, admitting of the use of a comparatively large wheel without elevating the plow-beam too high.

On the rear end of the plow-beam is secured the seed-box H, from which the seed is taken by a rotating dropping-wheel, I. This wheel works in a mortise in the plow-foot B, the journals $b$ of the wheel having their bearings in said foot.

In the periphery of the wheel I are made any desired number of pockets, $i$, for carrying the seed from the interior of the box to the rear of the plow-foot, where it is emptied in a conductor, J, secured to the rear of the plow-foot, and the seed is deposited immediately in rear of the plow C, in the furrow made by said plow.

The pockets $i$ in the wheel may be made adjustable—that is, enlarged or diminished in size—so as to drop more or less seed in each hill. This may be accomplished by any of the well-known and usual means.

To the lower end of the plow-foot B is pivoted the coverer K, of any suitable construction.

The wheel I, as above described, is to be used for planting corn, pease, or similar seed; but for cotton-seed this wheel will be removed and another with teeth or spikes in its periphery will be substituted.

Above the wheel I in the box H is a rotating stirrer for preventing the seed from clogging. This stirrer consists of a horizontal shaft, $d$, provided with a series of arms or fingers, $e$, and having its bearings in the sides of the box.

On one side of the box the stirrer-shaft $d$ and the shaft $b$ of the wheel I are provided with cranks $m$ $m$, which are set parallel to each other and connected by a rod, $n$.

On the same side of the machine the axle $a$ of the driving-wheel F is provided with a crank, $p$, which, by a pitman, P, is connected with the center of the connecting-bar $n$, above referred to. This pitman has a longitudinal slot, $s$, through which projects a pin, $t$, from the side of the plow-beam.

As the plow is drawn forward the wheel F is rotated, and by the connections P $n$ imparts a rotary motion to both the stirrer and the dropping-wheel.

It will be seen that, in operation, the dropping-wheel and stirrer rotate backward instead of in the same direction as the driving-wheel, which is caused by the slot $s$ in the pitman P and the pin $t$, projecting through said slot. This pin acts as a fulcrum for the pitman, the pitman then acting as a lever to throw the cranks $m$ over the dead-center and direct their motion. By the backward rotation of the dropping-wheel the seed in the pockets $i$ of the dropping-wheel is exposed to the view of the operator after it leaves the hopper, and before it drops into the conductor.

On the inner side of the pitman P, near the connecting-rod $n$, is formed a shoulder or offset, $x$, which is arranged in such a manner that when the machine moves forward it will form no impediment to the proper working of the parts; but if the driving-wheel should be turned backward it will form a stop at a certain point and prevent any further turning of the parts.

My machine is built so compactly that it can be used in stumpy, hilly, or smooth ground alike. No bands or chains are needed, and it is impossible for the wheels or any part of the machine to be stopped on the dead-center at any time. The seed drops behind the plow, in full view of the operator, enabling him to see at any time, without delay or stoppage, whether or not the machine is dropping the seed before the coverer has come over.

Having thus fully described my invention, what I claim as new, and desire to secure by Letters Patent, is—

1. In a seed-planter as herein described, the slotted pitman P, connecting the crank of the driving-wheel to the cranks of the dropping-wheel and stirrer by means of an intermediate bar, $n$, to the center of which the pitman is pivoted, and said pitman being guided by means of a pin, $t$, upon the frame, for throwing the cranks $m$ $m$ off of their centers, substantially as herein set forth.

2. The pitman P, provided with the shoulder or offset $x$, in combination with the connecting-rod $n$, as and for the purposes herein set forth.

In testimony that I claim the foregoing I have hereunto set my hand this 27th day of December, 1878.

W. J. MERCER.

Witnesses:
JOHN A. RESNERE,
JOHN YOUNG.